Figure 1:
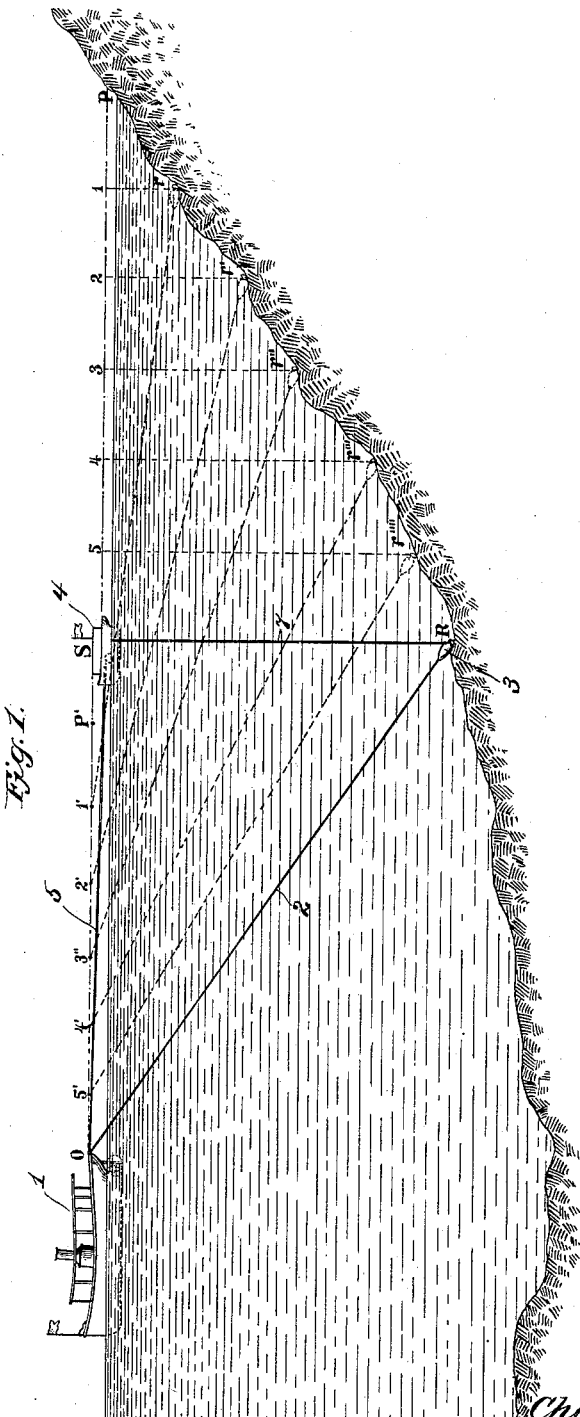

No. 608,741. Patented Aug. 9, 1898.
C. W. WOOD.
SOUNDING MACHINE.
(Application filed June 10, 1897.)
(No Model.) 3 Sheets—Sheet 1.

Witnesses
E. C. Wurdeman
Victor J. Evans

Inventor
Charles W. Wood
By John Wedderburn
Attorney

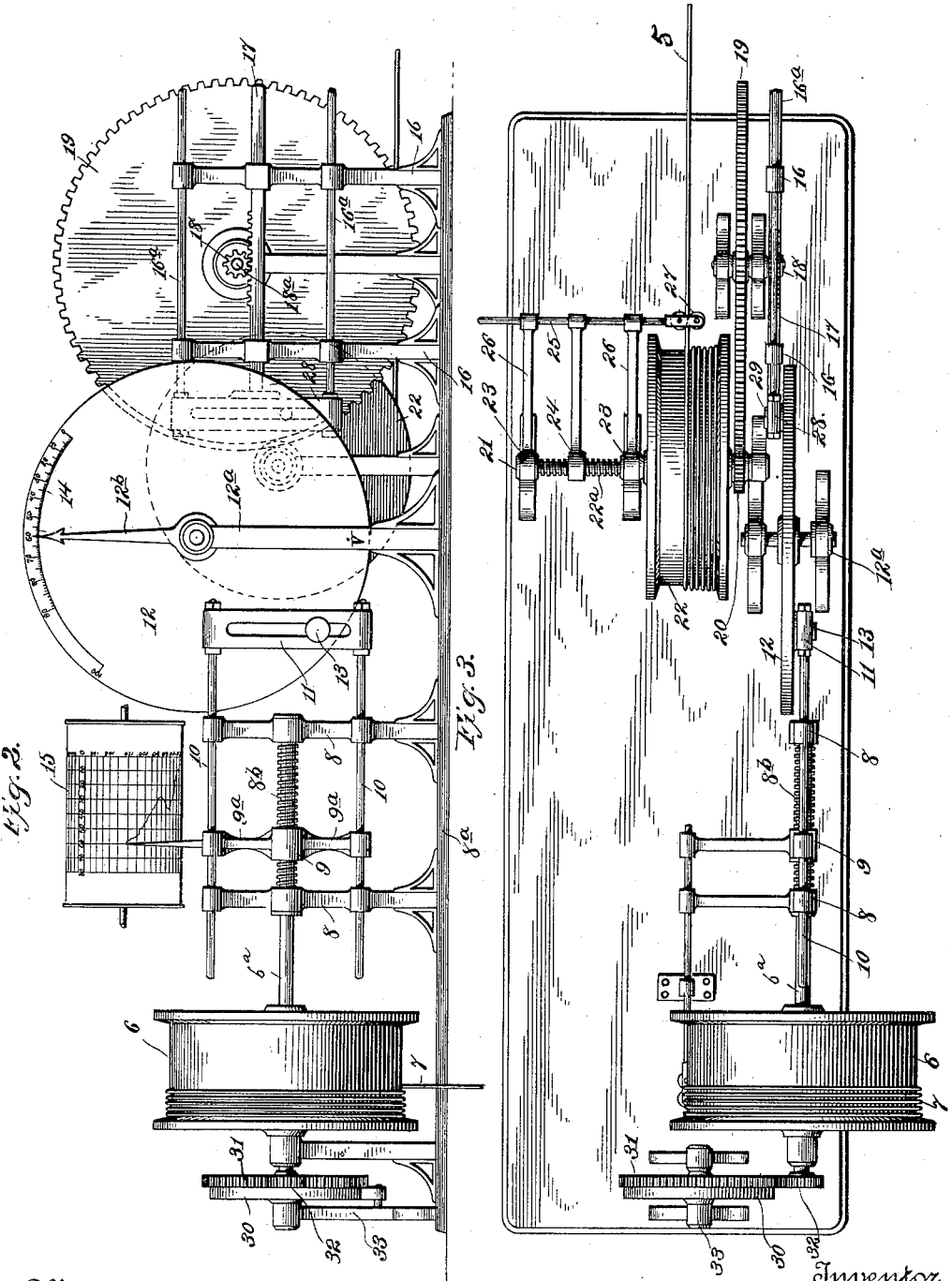

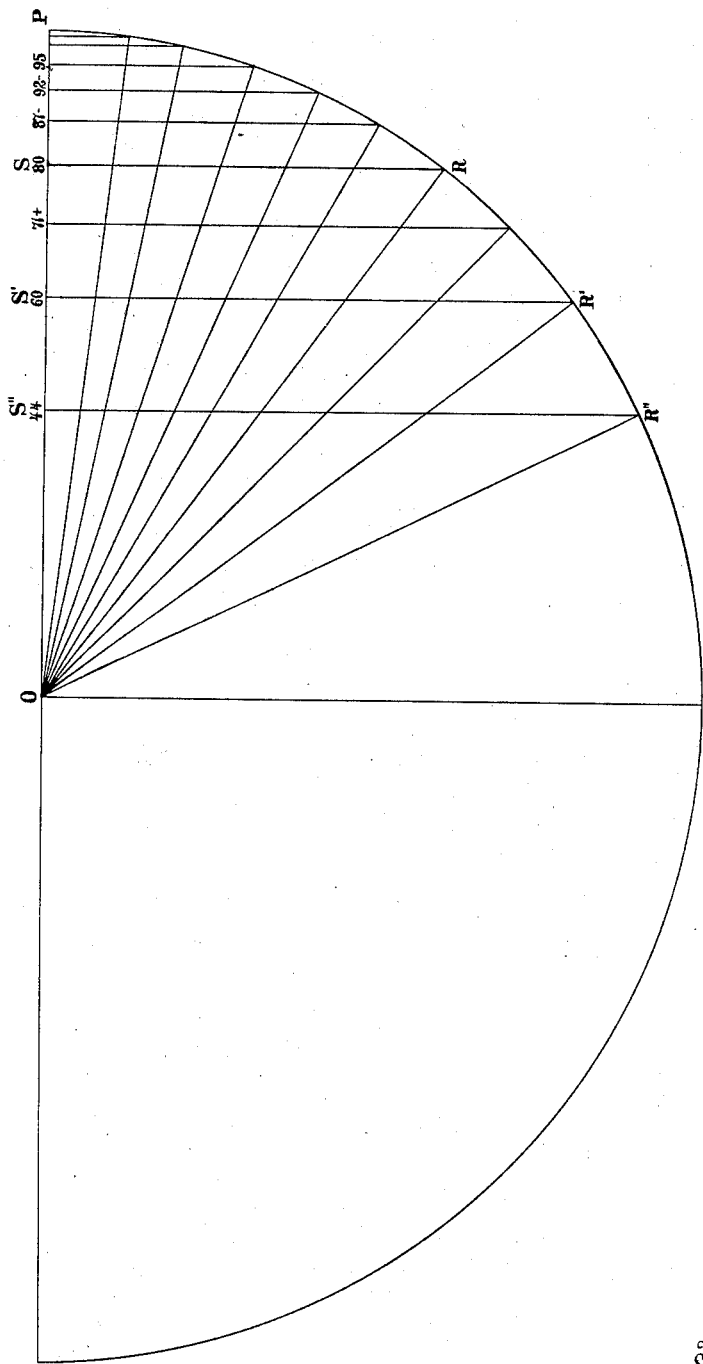

UNITED STATES PATENT OFFICE.

CHARLES WIDNEY WOOD, OF NEW ORLEANS, LOUISIANA.

SOUNDING-MACHINE.

SPECIFICATION forming part of Letters Patent No. 608,741, dated August 9, 1898.

Application filed June 10, 1897. Serial No. 640,233. (No model.)

*To all whom it may concern:*

Be it known that I, CHARLES WIDNEY WOOD, of New Orleans, in the parish of Orleans and State of Louisiana, have invented certain new and useful Improvements in Sounding-Machines; and I do hereby declare the following to be a full, clear, and exact description of the invention, such as will enable others skilled in the art to which it appertains to make and use the same.

This invention relates to certain improvements in machines designed for use in measuring and recording with accuracy sufficient for all practical purposes contours of the beds of rivers, lakes, or any similar body of water, the object being to provide in a simple and inexpensive manner a machine of this character for recording the different elevations or depths in the bed of a river, &c., in such manner that the liability to err will be greatly lessened and the labor involved considerably reduced.

In the system as now used during the progress of Government coast-surveys to take the various soundings at intervals the contour can only be approximated by connecting various charted soundings, the positions being determined by courses or triangulations, and hence unless the intervals are very short the results cannot be considered satisfactory.

The present invention is intended to overcome these difficulties and to avoid manual labor and chances of errors and comprises certain novel features of construction and arrangement of parts whereby many important advantages are gained and the machine better adapted for the purposes for which it is to be used, as will be hereinafter fully described and claimed.

In the accompanying drawings, Figure 1 represents a view of a river and its bed, showing the manner in which the soundings are taken by the improved machine. This view, however, does not illustrate any of the working parts. Fig. 2 represents a side elevation of the mechanism constructed in accordance with the invention and on which the soundings are properly taken and recorded. Fig. 3 is a plan view thereof. Fig. 4 is a diagraphical view showing the progressive movement of the cable used in connection with the sounding mechanism and by which the depth of the river-beds is determined.

Referring to the drawings, wherein the same numerals and letters of reference are employed to indicate corresponding parts in the several views, the numeral 1 designates a steam-launch or any suitable propelling-power, to the stern end of which is fastened a line 2, having a weight 3 at its rear termination which drags over the bottom of the river-bed, and the length of this line remains the same within the capacity of the machine, the contact-point thereof with the vessel forming the point of radius for the weight at the opposite end. For convenience it has been assumed that the radius is one hundred feet and the maximum sounding obtained eighty or ninety feet, and it will be seen that as the weight 3 passes along it describes arcs of a circle of one hundred feet radius, of which the connecting-point with the propelling-power is the center, and the vertical distance from the weight 3 to the surface of the water, which, of course, is the sounding, is then proportionate to the sine of the arc. The horizontal distance O S from the point at which the sounding-line cuts the surface to the center of the arc varies as the cosine of the arc. Hence as the point O progresses, if the same proportions are maintained as S R varies with the depth, then will S R, S' R', S" R", &c., be vertical lines and give the required depth, since the triangle S O R is right angled at S.

The machine is inclosed in a modeled float 4 and attached to the propelling-power 1 by a line, preferably wire, running from O to S. Within the float 4 is mounted a drum or spool 6, upon which a line 7 is wound, and the circumference of this drum or spool is such that as it revolves to unwind the line 7 the depth can be determined by the number of revolutions. For instance, if the drum is four feet in circumference and makes four revolutions the depth would be sixteen feet, and so on. The lower end of the line 7 is attached to the weight R, and through the lines O S, S R, and R O a right-angle triangle is formed. The drum or spool 6 is mounted upon a shaft 6$^a$, supported in suitable journals arranged on uprights or standards 8, rising from a base-plate 8$^a$, and on this shaft, between the journals and screw-threaded surface 8$^b$, is formed and adjustably secured a nut 9, having oppositely-positioned extensions 9$^a$, movable upon and guided by rods 10. These rods 10 pass through openings in opposite portions of the said uprights provided for the purpose and at one extremity are connected to a slotted plate 11, so that the rods will move simultaneously as the drum revolves to wind or unwind the line 7.

A disk 12 is rotatably mounted on a standard or upright 12$^a$ and is connected to the slotted plate 11 by means of a pin or stud 13, projecting from said disk and passing through the slot in the plate, said stud being secured to the disk for actuation thereof by a movement in one direction or the other of the drum 6, and in this operation the nut 9 will be moved so as to impart rotative movement to said disk. The said disk is provided with a series of graduations 14, with which a stationary finger 12$^b$, projecting from the upright 12$^a$, coacts or engages, and the parts are illustrated in the position they will assume when the line 7 has descended to the depth of sixty feet, and this indication of the line, as illustrated, will be designated by the finger 12$^b$ on the series of graduations 14 and point to "60." When the parts are in normal condition, the pin or stud 13 will be moved over to a point marked V, and the graduations on the disk will be brought around under the finger 12$^b$ until the latter points to zero.

A recording-cylinder 15 is preferably mounted adjacent to the nut 9, and may be arranged to revolve at a speed proportionate to that of the float 4 by any well-known means—such, for instance, as that used for ordinary log or current indicators—and the said cylinder will be provided with properly-sectioned paper, so that the pen secured to the nut may outline thereon the various depths of the soundings as it is moved by the action of the screw 8$^b$.

Standards or uprights 16 similar to those just described are arranged at the opposite sides of the disk 12 and are provided with suitable openings for the reception of bars 16$^a$, operatively connected to a rack 17, the teeth of which are engaged with the teeth of a pinion 18, secured to a shaft 18$^a$, having thereon a gear-wheel 19, the teeth of which mesh with the teeth of a pinion 20 on an adjacent shaft 21, carrying a drum 22. The shaft 21 is supported in suitable uprights or standards 23 and has formed on a part thereof screw-threads to engage the threaded opening of an arm 24, which has its opposite end secured to a rod 25, bearing in bracket-arms 26, also secured to the said uprights or standards 23. One end of the rod 25 is bifurcated to receive sheaves or pulleys 27, between which the line 5 passes as it winds and unwinds upon and from the drum 22 by the rotation of the latter, the movement of the said drum serving to shift the arm 24 and the attached rod 25, so that the sheaves or pulleys move across the face of the drum, and thus keep the line 5 in a proper relative position thereto. The rod 16 and rack 17 are secured together at one end by a plate 28, which is slotted to receive a pin 29, secured to the adjacent side of the disk 12 opposite to that on which the stud or pin 13 is located, so that as said disk 12 is rotated through the action of the nut 9 and plate 11 the rack 17 will also be operated and transmit through the pinion 18 a rotative movement to the gear-wheel 19, and thus cause the drum 22 through the pinion 20 to wind the line 5 upon its periphery. This movement is so proportioned that the line 5 is wound sufficiently to bring the float 4 to a vertical position over the weight 3, and it will be observed that the weight cannot descend without moving the float a proportionate amount. Hence the movement of the latter is always coincident with the former and must at all times be perpendicular to the surface of the water, and the exact sounding is thereby obtained.

Assuming the depths to decrease, the weight 3 must necessarily ascend and the line 7 be wound on the drum 6. This is accomplished by a spring 30 operating through a gear-wheel 31 and a pinion 32. This spring is secured to the gear-wheel 31 and to a standard 33 and is sufficiently strong only to wind up the line and operate the nut 9 in the proper direction, and for this reason also the line 7 is always under tension, due to the towing thereof by the propelling-power, and hence the drum 22 will unwind so long as permitted to do so by the nut 9. Thus the plate 4 and weight 3 are in the same vertical plane during the decreasing as well as the increasing depths. Should a swift current interfere with the recording or a forward motion of the float, or if the depths at any specified point be desired, records can be taken and triangulated at various positions of the float, the extent of observation being recorded on the cylinder 15 by means of a simple electrical device operating at the point of contact of the line with the propelling-power and through an insulated wire leading to and winding on separate drums, and in practice the drum will be sufficiently large in diameter to wind and unwind the lines or cables without undue bending, stress, or friction. The drum 22 may also be provided with a spiral spring or other similar device to assist the mechanism in winding in the line 5 during increasing depths, as the constant tension between the propelling and float power is sufficient to overcome the action of the spring in unwinding the drum.

In Fig. 4 a diagraphical view is presented which illustrates the progressive movement of the weight in ascertaining the sounding, and, as hereinbefore described, the radius having been assumed to be one hundred feet and the maximum sounding obtained to be eighty or ninety feet. In this view the line 7 shows an indicated depth of ninety feet, the drag-line 2 inclining from the point of radius marked "O" to the vertical line marked "S" R"." These vertical lines, as shown, run ten feet from the shore, the place of commencement being a point marked "P," so that as the propelling-power moves the float 4 over the surface of the water the line 2 will gradually descend or ascend, as the case may be, as clearly shown by the series of radial and vertical lines.

Modifications may be made without departing from the essential features of the invention, and the latter is not limited to the precise details herein shown and described, the right being reserved to make such changes and alterations therein as may fairly fall within its spirit and scope.

Having thus described my invention, what I claim as new, and desire to secure by Letters Patent, is—

1. A machine for ascertaining and recording the depths of soundings comprising a drag-line having a weight, a tow-line, a float, and a suspending-line, the said tow-line and suspending-line being automatically maintained in a constant relative position to each other.

2. A machine for ascertaining and recording the depths of soundings, comprising a drum or spool carried in suitable bearings, a line arranged to wind and unwind upon said drum and spool and adapted to descend to the bottom of the river, a float arranged to carry said drum, a drag-line secured at one end to a suitable propelling-power, and at its other end to a weight, a drum arranged upon said float having a line leading therefrom to the said propelling-power, and means to operate with said drum through the winding and unwinding of the lines thereon to record the soundings, substantially as described.

3. A machine for ascertaining and recording the depths of soundings, comprising a drum or spool carried in suitable bearings, a line arranged to wind and unwind on and from the said spool and provided with a weight adapted to descend to the bed of a river or other body of water, a disk rotatably carried in suitable bearings and designed to be rotated through the winding and unwinding of the line on and from the drum, said disk having graduations thereon, a stationary finger arranged adjacent to said graduations, a float supporting the said mechanism, a drag-line secured at one end to a suitable propelling-power and at its other end to a weight, a drum arranged upon said float having a line leading therefrom and connected to said propelling-power, and means to operate said disk as the lines upon the drums are wound and unwound to record the depths of soundings.

4. A machine for ascertaining and recording the depths of soundings, comprising a drum or spool mounted on a shaft carried in suitable bearings, one end of said shaft being screw-threaded to receive a nut having extensions thereon to which are secured guide-rods adapted to move in openings in said bearings, a slotted plate secured to the said rods at one end thereof, a graduated disk having a pin therein adapted to engage to move in said slot, a line arranged to wind and unwind the said drum or spool and adapted to descend to the bed of the river, a drag-line secured at one end to a suitable propelling-power and at its other end to a weight, to which latter the line secured to the drum is also attached, and a second drum arranged upon a float, on which the sounding mechanism is arranged, connected to the propelling-power by a line leading therefrom and passing over said drum, a pinion arranged upon the shaft carrying said drum and meshing with a gear-wheel arranged to rotate through a movement of the disk as the sounding-line is wound and unwound upon its drum, substantially as described.

5. A machine for ascertaining and recording depths of soundings, comprising a drum or spool having a sounding-line arranged thereon and adapted to descend to the bottom of the river, said drum being mounted on a shaft carried in suitable bearings, one end of said shaft being screw-threaded to receive a nut adapted to move back and forth thereon as the line is wound or unwound upon the drum, rods arranged to move in bearings, said rods being secured to extensions formed on the nut and being provided at one end with a slotted plate, a graduated disk having a pin projecting therefrom and engaging said slotted plate, a finger adjacent to the graduations on said disk and adapted to indicate the depths of soundings through the movement back and forth of the nut as the sounding-line rises and falls, a second drum arranged upon a shaft mounted in suitable bearings, said shaft being provided at one end with screw-threads to receive the threaded opening of an arm, to the free end of which arm is fastened a rod having at one end sheaves or pulleys, the said shaft at its other end being provided with a pinion, a gear-wheel arranged upon a shaft and meshing with said pinion, a rack moving in suitable bearings, the teeth of which are adapted to engage with the teeth of a pinion mounted on the shaft which carries the gear-wheel, a slotted plate arranged at one end of said rack, and a pin secured to the disk and adapted to engage said plate, a line wound upon said drum and passing between said sheaves or pulleys, the other end of said line being secured to a suitable propelling-power, substantially as described.

6. A machine for ascertaining and recording the depths of soundings, comprising a drum or spool carried on a shaft mounted in suitable bearings, one end of said shaft being provided with a pinion adapted to mesh with a gear-wheel, a spring secured to said gear-wheel, and the other end of said shaft being provided with screw-threads, a nut engaging said threads and having extensions thereon secured to the rods adapted to move in suitable guideways, said rods being provided at one end with a slotted plate, and one of the extensions of said nut being provided with a pen, a graduated disk rotatively held in suitable uprights and provided with a pin adapted to engage the slotted plate referred to, a stationary finger adjacent to the graduations on the disk, a line arranged to wind and unwind upon said drum or spool, and adapted to descend to the bed of the river, through the rise and fall of which the disk and nut are moved to record the depths of the sounding, a second drum mounted upon a shaft, one end of which is provided with screw-threads adapted to engage the threaded opening of an arm, the outer free end of which arm is secured to a rod having pulleys or sheaves at one end thereof, a rack adapted to slide in bars the teeth of which mesh with the teeth of a pinion mounted in a shaft carrying a gear-wheel adapted to mesh with a pinion located on the end of the shaft carrying the drum, a slotted plate secured to one end to engage with a pin secured to the disk, and a line adapted to pass over said drum, between the sheaves or pulleys, and connected at its free end to a suitable propelling-power, a drag-line secured to said propelling-power and provided at its other end with a weight to which weight the free end of the sounding-line is secured, the rise or fall of the latter serving to rotate the drum in one direction or the other to record the soundings, substantially as described.

7. A machine for ascertaining and recording the depth of soundings, comprising a float, a tow-line, a drag-line attached to a weight, a suspending-line also attached to said weight, drums upon which the said tow and suspending lines are wound and unwound, and an interposed disk automatically equalizing the operative relation of the said drums.

8. A machine for ascertaining and recording the depths of soundings, comprising a tow-line, a suspending-line attached to a weight, a drag-line also attached to said weight, and mechanism for automatically maintaining a constant position of the tow and suspending lines relatively to each other.

9. A machine for ascertaining and recording the depths of soundings, comprising a tow-line, a drag-line attached to a weight, a suspending-line attached to said weight, a float to which the tow and suspending lines run, drums on the float situated at right angles to each other, interposed mechanism between the drums for equalizing the movement thereof, and means for automatically recording the soundings as taken.

In testimony whereof I have signed this specification in the presence of two subscribing witnesses.

CHARLES WIDNEY WOOD.

Witnesses:
RICHARD B. MONTGOMERY,
JNO. F. WHITAKER.